(12) United States Patent
Liljerehn (10) Patent No.: US 10,434,615 B2
(45) Date of Patent: Oct. 8, 2019

(54) MEASUREMENT DEVICE AND A METHOD OF SELECTING OPERATIONAL PARAMETERS OF A CHIP REMOVING MACHINING TOOL

(71) Applicant: SANDVIK INTELECTUAL PROPERTY AB, Sandviken (SE)

(72) Inventor: Anders Liljerehn, Sandviken (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 213 days.

(21) Appl. No.: 15/533,667

(22) PCT Filed: Nov. 26, 2015

(86) PCT No.: PCT/EP2015/077738
§ 371 (c)(1),
(2) Date: Jun. 7, 2017

(87) PCT Pub. No.: WO2016/091601
PCT Pub. Date: Jun. 16, 2016

(65) Prior Publication Data
US 2017/0312874 A1   Nov. 2, 2017

(30) Foreign Application Priority Data
Dec. 8, 2014   (EP) .................................. 14196826

(51) Int. Cl.
*B23Q 17/12*   (2006.01)
*G01H 13/00*   (2006.01)
(Continued)

(52) U.S. Cl.
CPC ......... *B23Q 17/0904* (2013.01); *B23Q 17/12* (2013.01); *G01H 13/00* (2013.01); *G01P 15/18* (2013.01)

(58) Field of Classification Search
CPC ..... B23Q 17/0904; B23Q 17/12; G01P 15/18; G01H 13/00
(Continued)

(56) References Cited

U.S. PATENT DOCUMENTS 4,559,600 A * 12/1985 Rao .................... G05B 19/4163
340/680
5,957,016 A   9/1999 Segalman et al.
(Continued)

FOREIGN PATENT DOCUMENTS

| DE | 102008052954 A1 | 4/2009 |
|---|---|---|
| WO | 2006039448 A2 | 4/2006 |
| WO | 2014052426 A1 | 4/2014 |

OTHER PUBLICATIONS

McKelvey et al. Estimation of phase constrained mimo transfer functions with application to flexible structures with mixed collocated and non-collocated actuators and sensors:, World Congress, vol. 16, p. 36, 2005.
(Continued)

*Primary Examiner* — Jacques M Saint Surin
(74) *Attorney, Agent, or Firm* — Corinne R. Gorski (57) ABSTRACT

A measurement device for a chip removing machine, and methods of obtaining frequency response functions, obtaining stability charts and selecting operational parameters of a chip removing machining tool are disclosed. The device includes an engagement portion at the rear end for engagement with the machine and a measurement portion at the front end. The measurement portion is without a tool tip and includes a planar front end surface perpendicular to the centre axis. The front end surface has a coupling point aligned with the centre axis for receiving mechanical excitation. The front end surface further includes a plurality of seats for receiving one accelerometer each for measuring a response of the received mechanical excitation. When an
(Continued)

accelerometer is received in one of the seats, and abutts against three contact surfaces thereof, it is positioned and oriented three dimensionally and around three axes of rotation in relation to the coupling point.

20 Claims, 6 Drawing Sheets

(51) Int. Cl.
*G01P 15/18* (2013.01)
*B23Q 17/09* (2006.01)

(58) Field of Classification Search
USPC .......................................................... 73/579
See application file for complete search history.

(56) References Cited

U.S. PATENT DOCUMENTS

| | | | |
|---|---|---|---|
| 7,536,924 B2* | 5/2009 | Schmitz | B23Q 17/0971 |
| | | | 73/1.08 |
| 7,798,012 B2* | 9/2010 | Rosen | G01M 13/02 |
| | | | 73/760 |
| 2007/0088456 A1 | 4/2007 | Schmitz et al. | |
| 2007/0277609 A1* | 12/2007 | Schmitz | B23Q 17/0971 |
| | | | 73/584 |
| 2010/0145496 A1 | 6/2010 | Tang et al. | |
| 2011/0066277 A1* | 3/2011 | Mann | B23B 29/125 |
| | | | 700/174 |

OTHER PUBLICATIONS

Sjovall, P. "Identification and synthesis of components for vibration transfer path analysis", Ph.D. thesis, Chalmers University of Technology, Gothenburg, Sweden. 2007.

* cited by examiner

MEASUREMENT DEVICE AND A METHOD OF SELECTING OPERATIONAL PARAMETERS OF A CHIP REMOVING MACHINING TOOL

RELATED APPLICATION DATA

This application is a § 371 National Stage Application of PCT International Application No. PCT/EP2015/077738 filed Nov. 26, 2015 claiming priority of EP Application No. 14196826.3, filed Dec. 8, 2014.

TECHNICAL FIELD

The invention relates to a measurement device for a chip forming cutting machine and methods of obtaining frequency response functions, obtaining stability charts and selecting operational parameters of a chip removing machining tool.

BACKGROUND

The strong competition in manufacturing industry has led to a constant search for efficient cutting operations to reduce cost. Increased productivity requires faster machining and lower cycle times. In order to meet these demands it is desired that process parameters, such as cutting speed, feed velocity and depth of cut are taken to the next level. As a consequence of modified process parameters, an increase in cutting forces and temperature in the cutting zone follows. Elevated process temperatures and cutting forces accelerates tool wear and may contribute to work piece distortion. Increased cutting forces also make the machining process more prone to regenerative vibrations. This phenomenon is known as chatter.

Chatter vibrations compromise the quality of the machined work piece surface, it may break the cutting tool, and in extreme cases it may lead to damage of the machine tool. Chatter vibrations can occur in all metal cutting processes and is one of the most common productivity limiting factors in metal machining. One reason for chatter is dynamic force feed-back due to variation in chip thickness during cut. The variation in chip thickness may originate from a phase shift in vibration marks left on the machined surface between two consecutive cuts. This phase shift may thus be dependent on the dynamics of the machine tool/cutting tool assembly. The spindle speed n and number of cutting teeth z govern the period time between cuts. Since the spindle speed is a process parameter to be selected by the operator, this parameter can be chosen so that the vibration marks from the previous cut is in phase with the current cut. If the vibration marks between cuts is in phase then force feed-back is at least considerably reduced and as a consequence, also the regenerative vibrations.

Figure 6:
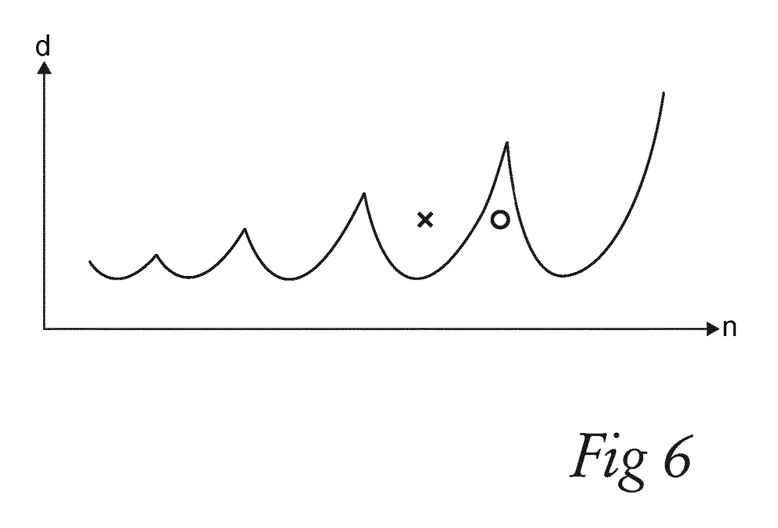
FIG. 6 shows an example of a stability chart of a cutting tool.

To be able to predict the dynamic behaviour of a cutting tool, a stability lobe chart may be plotted. One example of such a chart is shown in FIG. 6. The chart should be read as follows. If a spindle speed (rotational speed, n) in combination with a depth of cut (d) lies below the line, then the cutting process should be stable. If the cutting parameter combination, on the other hand, lies above the line then the process may be unstable.

Regardless of methodology chosen to predict the stability boundary for a cutting process it is advantageous to know the frequency response functions (FRF) at the tool tip of the cutting tool mounted in the machine tool. The state-of-the-art is to obtain the FRFs at the tool tip by physical testing of a multitude of machine-tool/cutting tool combinations. The downside to this approach is that not only is it required to obtain the FRFs for all cutting tools of interest, since the dynamic properties changes with the variation in geometric properties for the different cutting tools, but it also requires that the machine tool is still standing during measurements. This results in loss of valuable production time.

On the other hand, modelling of a complete machine tool structure, i.e. the combined system of a machine tool with mounted cutting tool, would be hard because of the mechanical complexity of the complete system. Thus it is a problem to simplify predictions on the dynamic behaviour of a complete machine tool system.

SUMMARY OF THE INVENTION

Thus, it is an object of the present invention to provide for measurements of the dynamic response of a substructure of a cutting tool, mounted in a machine. It is further an object to provide a measurement device which may be used to provide measurements to be combined with models of various tool tips in order to predict dynamic behaviour in the form of stability charts of a wide variety of cutting tools in a cutting machine, in a cost efficient manner. It is also an object to provide accurate and repeatable measurements of the dynamic response of a tool substructure.

Thus, the invention relates to a measurement device for a chip removing machine, the device having a front end and a rear end. A centre axis extends between the front end and the rear end. The device comprises an engagement portion at the rear end for engagement with the machine and a measurement portion at the front end, distal to the engagement portion, which measurement portion is without a tool tip. The measurement portion comprises a planar front end surface, perpendicular to the centre axis. The front end surface comprises a coupling point for receiving mechanical excitation. The coupling point is aligned with the centre axis. The front end surface further comprises a plurality of seats for receiving one accelerometer each, for measuring a response of the received mechanical excitation. Each seat comprises three contact surfaces for the accelerometer such that, when an accelerometer is received in one of the seats and abutting against the three contact surfaces, it is positioned and oriented in three dimensions in space and around three axes of rotation in relation to the coupling point.

Figure 5A:
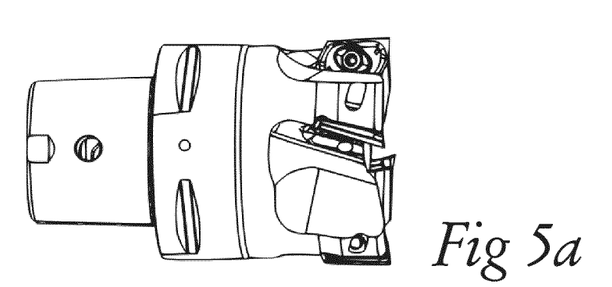
FIG. 5 illustrates substructuring of a cutting tool.
Figure 5B:
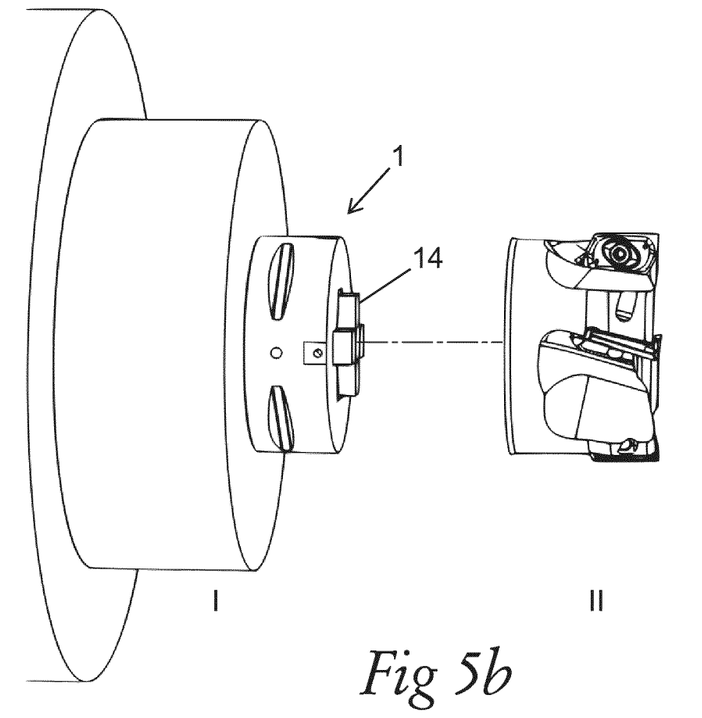

In general, a cutting tool for being mounted in a chip removing machine comprises a body having a rear coupling part, a middle part and a front part in form of a tool tip extending from the middle part. The tool tip is the part of the tool that is active in the cutting operation and can include cutting edges, chip flutes, cutting inserts, inserts seats and insert holding/clamping components. Normally, in a range of cutting tools for a machine, the cutting tools differ from each other only in the design of the tool tip. A basic body of the measurement device according to the present invention can be regarded as corresponding to a unit consisting of the rear coupling part and the middle part of a cutting tool. In other words, a cutting tool without a tool tip, or, the common part of cutting tools in a range for a machine. As an example, FIG. 5 (*a*) shows a cutting tool in the form of a rotatable milling tool, and FIG. 5(*b*) shows the tool tip (II) and a measurement device mounted in a machine (I).

The construction of the measurement device allows for accurate and repeatable measurements of the dynamic response of a tool substructure, i.e. a substructure consisting of a machine with coupled measurement device, because of the well-defined position and orientation of the accelerometers relative each other and relative the coupling point. Further to this, the mounting and alignment of the accelerometers with respect to each other and to a direction of mechanical excitation is facilitated. The measurements of the dynamic response of the tool substructure may be used to predict vibration performance of a wide variety of cutting tools in a cutting machine, together with modelled data of various tool tips. In these calculations, the machine with coupled measurement device can be regarded as a first substructure and each tool tip as a second substructure.

The planar front end surface of the inventive device facilitates coupling of frequency response functions of the substructures. The coupling point is a point where a substructure defined as the tool tip can be coupled to a substructure defined as the measurement device together with the cutting machine when calculating frequency response functions for a combined structure corresponding to the machine with mounted cutting tool.

Thanks to the three contact surfaces the position and orientation of each accelerometer is well defined. Thus the position and orientation of the accelerometers relative each other and relative the coupling point is known.

One of the three contact surfaces may be an axial contact surface, which extends perpendicular to the centre axis. Thus, the axial support surface can define the position of the accelerometers in the axial direction. When an accelerometer is placed in the recess and abuts against the axial support surface, it will be correctly supported with respect to the direction of the centre axis, and also with respect to a direction of excitation at the coupling point. The centre axis defines an x-direction of a Cartesian coordinate system. Y and z-axes of this coordinate system are defined in the plane of the front end surface.

One of the three contact surfaces may be a radial contact surface, thus providing support in a direction from the periphery towards the centre axis. The radial contact surface of each seat may be positioned at the same distance to the coupling point. Thus the accelerometers may be distributed around the coupling point and positioned with the same radial distance from the coupling point to simplify and improve measurements and calculations on the dynamic response. The accelerometers may thus also be placed as close as possible to the coupling point while allowing mechanical excitation of the device at or close to the coupling point.

One of the three contact surfaces may be a tangential contact surface. Thus the accelerometers may be provided with a tangential position definition to define the position of each accelerometer around the coupling point. The tangential direction is defined as perpendicular to the radial direction, i.e. in a circumferential direction around the centre axis. The radial contact surface may be arranged with a normal vector in the positive or negative y-direction, or the positive or negative z-direction, or angled to the y- or z-direction, e.g. 30, 45, 60 degrees to the y- or z-direction.

The measurement device may have four seats for receiving and positioning four accelerometers around the coupling point. Thus the accelerometers may be arranged pairwise on opposite sides of the coupling point, thus aligned two and two in two orthogonal directions, to be able to measure translational movements as well as rotational movements at the coupling point. The seats may be arranged such that the accelerometers may be co-oriented and pairwise collinear. The excitation may thus be made in line with the axis of alignment of one pair of the accelerometers and orthogonal to the axis of alignment of the other pair of the accelerometers. The risk of violating the passivity criterion (T. McKelvey and S. O. R. Moheimani, "Estimation of phase constrained mimo transfer functions with application to flexible structures with mixed collocated and non-collocated actuators and sensors", in World Congress, Vol. 16, p. 36, 2005) is thereby reduced.

As an alternative, the measurement device may have three seats for receiving and positioning three accelerometers around the coupling point, and as a further alternative, the measurement device may have two seats for receiving and positioning two accelerometers around the coupling point. The two seats are preferably arranged on opposite sides of the coupling point.

The seats may be rotational symmetrical arranged around the coupling point. Thus, calculations of the frequency response functions are facilitated. The rotational symmetry is advantageous since the seats may be positioned as close as possible to the coupling point. The rotational symmetry may be e.g. twofold, threefold or fourfold, depending on the number of seats. For a twofold rotational symmetry the two seats are situated 180 degrees from one another and for a threefold rotational symmetry the three seats are situated 120 degrees from one another. For a fourfold rotational symmetry the four seats are situated 90 degrees from one another. In the fourfold symmetry the accelerometers received in the seats are arranged pairwise on opposite sides of the coupling point, in two orthogonal directions, to be able to measure translational movements as well as rotational movements at the coupling point.

The seats may be formed as recesses in the front end surface. Thus the accelerometers received in the seats may be at least partially embedded in the front end surface of the measurement portion. The additional mass of the accelerators may be at least partly be compensated for by the removed material from the recesses. Thereby the resemblance of the measurement device with an actual tool without tool tip will increase, which will improve the measurements on dynamic response. Also, the accelerometers may be positioned such that the actual measurement plane of the accelerometers may be brought close to the plane of the front end surface for improved measurement accuracy. Also the seats may be formed in a simple manner in the front end surface. As an alternative, the seats may be formed by protrusions from the front end surface, forming the three contact surfaces. The support surfaces are placed and positioned corresponding to the shape of the accelerometers.

Each seat may be formed as a substantially cuboid recess for receiving an accelerometer of cuboid shape. Thus the mounting of the accelerometers may be simplified, and the material removal in the measurement portion may be minimized to reduce any influence on the measurements. Other shapes of recesses are also conceivable, such as with elliptic or polygonal cross-sections. The recesses have a shape corresponding to the shape of the accelerometers. Typically the sides of a rectangular cross-section of the cuboid recess, in the plane of the front end surface, may be in the range of 10-15 mm, preferably about 12 mm, and wherein the depth of the recess may be about 0.5-3 mm.

Each seat may be a part of a single, common recess, or in other words, each recess may be connected to the neighboring seats by a recess, thereby simplifying machining and providing a straight radial contact surface without concave corners from machining of the recess to improve the positioning accuracy of the accelerometers.

In embodiments having four recesses for four accelerometers, such a single, common recess may have the form of a cross, wherein a square piece of material is left at the center axis. The coupling point can be arranged on the center of the square. In these embodiments, the radially outwards facing surfaces of the square form the radial support surfaces in the respective seats.

The measurement device may be configured for engagement with a rotatable spindle of the machine, with a rotational axis, and wherein, when the device is in engagement with the spindle, the centre axis of the device is in line with the rotational axis. The front end surface may thus be perpendicular to the rotational axis and a natural interface may be formed between first and second substructure during modelling of dynamic properties of a cutting tool.

The engagement portion may comprise a rear end surface and a tapered male coupling part with a rounded polygonal cross-section, which male coupling part protrudes rearward from the rear end surface, wherein the rear end surface is radially outside the male coupling part and forms a contact surface. Thus, mounting of the measurement device in the machine may be simplified and using e.g. Sandvik Capto® couplings. The measurement device in the machine may thus be almost identical with a cutting tool mounted in the machine, but without the tool tip. Other couplings such as HSK and 7/24 ISO taper standard couplings may alternatively be used.

The measurement portion may have a cylindrical envelop surface which connects to the planar front end surface at the front end, wherein two planar excitation surfaces for coupling a source of mechanical excitation normal to the respective excitation surface are formed in the envelop surface. The two planar excitation surfaces are perpendicular to one another and to the front end surface and with their normal axes crossing the centre axis. Thus, the two excitation surfaces ensure together with the coupling point that excitation may be applied in three directions, which are perpendicular to one another and directed towards or aligned with the centre axis. The two excitation surfaces may be arranged with a normal vector in the y- respective z-direction, to receive mechanical excitation along the y- respective z-direction.

Gripper grooves for tool exchange may be formed in the envelop surface for simple mounting/dismounting of the measurement device.

The measurement device may comprise one accelerometer received in each seat. The accelerometers may be three-axis accelerometers able to measure acceleration in three axes, perpendicular to each other. Alternatively, one or more of the three-axial accelerometer may be replaced e.g. by a plurality of one- or two-axial accelerometers.

The accelerometers may have a cuboid shape with a bottom surface and a forward surface, wherein each seat is formed as a recess in the front end surface, wherein one of the three contact surfaces of each seat is an axial contact surface, which extends perpendicular to the centre axis, wherein another one of the three contact surfaces of the seat is a radial contact surface for providing support in a direction towards the centre axis, and wherein the bottom surface is in contact with the axial contact surface of the seat, and wherein at least a portion of the forward surface is in contact with the radial contact surface of the seat. Other shapes of the accelerometers are also conceivable as long as the orientation of the accelerometer may be determined, such as with an elliptical or polygonal cross-section. The support surfaces of the seat will then have a shape and position corresponding to the differently shaped accelerometer.

Each seat may comprise a second radial surface, radially outside the accelerometer, wherein a gap is formed between the accelerometer and the second radial surface. Thus the mounting of the accelerometers may be simplified and the positioning of the accelerometers may be made by inserting the accelerometer in the seat and pushing it towards the radial surface providing support in a direction towards the centre axis. Alternatively, the seat may be open towards an outer radial direction.

The accelerometers have a height and each recess may have a depth much less than the height of the accelerometers, such that a major portion of the accelerometers extend from the front end surface. Thus the mounting of the accelerometers may be precise, and at the same time the accelerometers extend from the front surface sufficiently to allow for connection of cables for measurements. Alternatively the accelerometers may be embedded in the front end surface and cables connected perpendicular to the front end surface.

The accelerometers may be attached to the seats by adhesive. Alternatively the accelerometers may be fastened by mechanical fastening, e.g. by screws or by press fit, or by magnets.

The invention further relates to a method of obtaining frequency response functions of a chip removing machining tool in a machine, comprising defining two substructures, a first substructure consisting of the machine with mounted tool, without a tool tip, and a second substructure consisting of the tool tip of the tool, mounting a measurement device as disclosed herein and corresponding to the tool without a tool tip in the machine, mounting one accelerometer in each seat, exciting the measurement device with mechanical energy, measuring the response of the excitation by the accelerometers and calculating frequency response functions of the measurement device mounted in the machine, from the measured excitation response, associating the frequency response functions of the first substructure with the frequency response functions of the measurement device mounted in the machine, calculating (or measuring) frequency response functions of the second substructure, and coupling the frequency response functions of the first and second substructures to obtain frequency response functions for an assembled system comprising the first and second substructures.

Thereby, frequency response functions of a multitude of cutting tools mounted in a machine may be obtained in an efficient manner, without the need to measure each cutting tool for each machine. The frequency response functions may be obtained by measuring the response for the measurement device, when mounted in the machine, thus obtaining the frequency response functions of the machine and the tool up to the front end surface defining the interface between the first and second substructure. The frequency response functions of the second substructure, i.e. the various tool tips of the multitude of cutting tools, may be calculated e.g. by finite element methods (FEM), and the frequency response functions combined to obtain the frequency response functions of each type of cutting tool mounted in the machine.

Exciting the measurement device with mechanical energy may comprise sequentially exciting the device with mechanical energy in three directions which are perpendicular to one another. Thus mechanical excitation in each such perpendicular direction may be used as input in the measurement of the frequency response functions.

Alternatively, the excitation of the measurement device with mechanical energy may comprise simultaneously exciting the device with mechanical energy in three directions which are perpendicular to one another. The advantage of this is that the system is not modified between subsequent steps of excitation.

The excitation may be performed by an actuator providing vibrations (shaker actuator) or one or more impulses, e.g. an impulse hammer.

The directions of excitation of the device are preferably the axial direction and two directions in the plane of the front end surface each aligned with a direction of alignment of one pair of accelerometers. Thereby the risk of violating the passivity criterion for dynamical systems is reduced.

The method may comprise obtaining stability charts of a chip removing machining tool in a machine, comprising obtaining combined frequency response functions of the tool in the machine and calculating stability charts for the combined structure based on the combined frequency response functions. Thus stability criteria may be obtained for a multitude of cutting tools in the machine, which may be used to determine stable operational parameters for machining.

The method may comprise selecting stable operational parameters of a chip removing machining tool in a machine, comprising obtaining stability charts of a chip removing machining tool in a machine, and selecting operational parameters falling within the stability charts.

BRIEF DESCRIPTION OF DRAWINGS

In the following, various embodiments of the invention will be described in detail with reference to the appended drawings, where.

DETAILED DESCRIPTION OF VARIOUS EMBODIMENTS

FIG. 1 (a) shows a measurement device 1 for a chip removing machine in a perspective view from the front, FIG. 1 (b) shows a corresponding view from the rear of the device and in FIG. 1 (c) a side view of the device is shown. The device has a body with a front end 10 and a rear end 11, and between those ends a centre axis x extends. The device comprises an engagement portion 2 at the rear end for engagement with a rotatable spindle of the machine, wherein the rotational axis corresponds to the centre axis x when mounted in the machine.

Figure 1A:
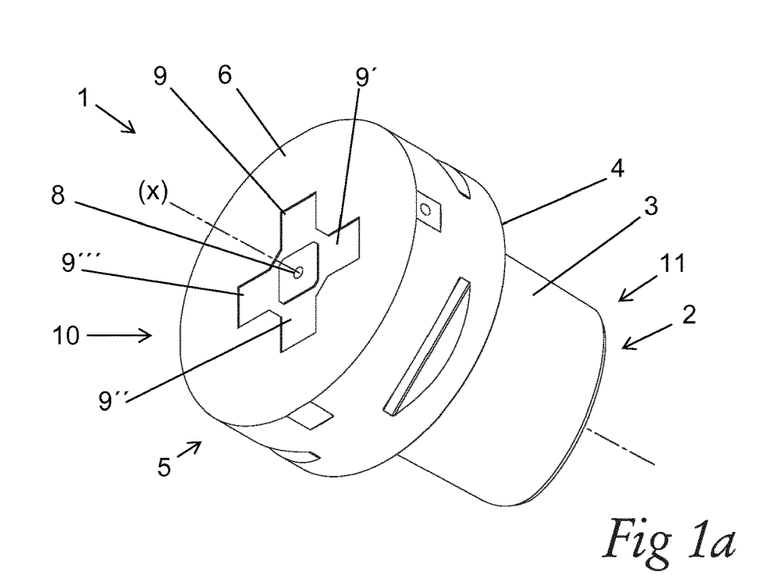
FIG. 1 shows a measurement device according to a first embodiment, in different orientations (a)-(d).

Distal from the engagement portion, at the front end of the device, the measurement device comprises a measurement portion 5 having a planar front end surface 6. The front end surface is perpendicular to the x-axis. The measurement portion is generally circular cylindrical, and has a cylindrical envelop surface which connects to the planar front end surface at the front end. The envelop surface is provided with gripper grooves 7 for dismounting and exchanging the device.

Central on the planar front end surface, at the rotational axis a coupling point 8 is defined. At the coupling point there is a threaded hole for attachment of a mechanical excitation device (shaker actuator) for mechanical excitation of the measurement device along the x-axis.

Around the coupling point 8 four seats 9, 9', 9", 9''', for receiving one accelerometer each, are formed in the front end surface 6. The seats are rotational symmetrical arranged around the coupling point, separated by 90 degrees. Each seat is formed by machining a recess in the front end surface and comprises three contact surfaces for an accelerometer. The accelerometers have a cuboid shape which may be received in a recess forming a seat. When an accelerometer is received in one of the seats, and abutting against the three contact surfaces, it is positioned and oriented in three dimensions in space and around three axes of rotation in relation to the coupling point. One of the contact surfaces is a bottom contact surface of the recess which is planar and parallel with the front end surface, and thus oriented perpendicular to the direction of the centre axis. Another one of the three contact surfaces of the seat is a radial surface providing support in a direction towards the centre axis. The radial surfaces of the seats form surfaces of a substantially square-shaped support structure around the coupling point, and wherein the distance of each such radial support surface to the coupling point is the same. As shown in the drawings, each seat is connected to the neighboring seats by a recess, thereby simplifying machining and providing a straight radial contact surface without concave corners from machining of the recess to improve the positioning accuracy of the accelerometers. A third contact surface is a lateral (or side) contact surface, providing sideways support of the accelerometer in a direction perpendicular to the axial and the radial direction.

Two planar excitation surfaces 12, 13 are formed on the envelop surface of the measurement portion for coupling a source of mechanical excitation normal to the respective excitation surface. The excitation surfaces 12 and 13 are perpendicular to one another and to the front end surface 6. Their respective normal axes are directed such that they are crossing the centre axis, i.e. the excitation surfaces are radial surfaces with respect to the centre axis.

Figure 1B:
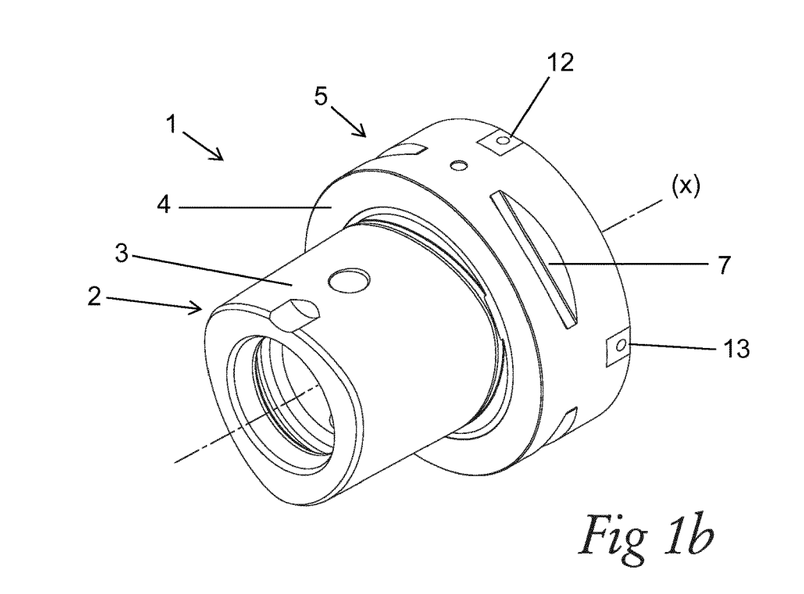
Figure 1C:
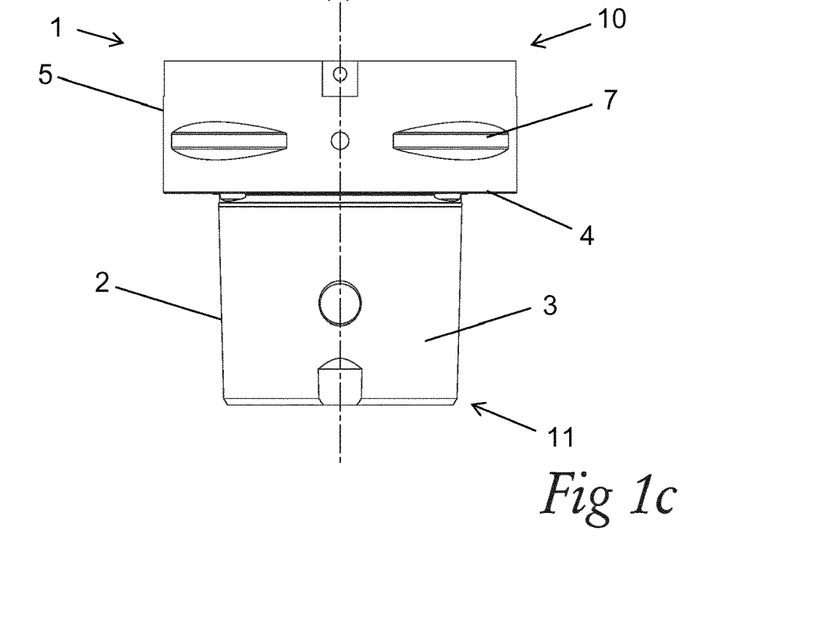

With reference to FIG. 1(b) the rear end of the device is shown. The engagement portion comprises a rear end surface 4 and a tapered male coupling part 3 with a rounded polygonal cross-section protruding rearward from the rear end surface. The rear end surface is radially outside the male coupling part, forming a contact surface. The engagement portion shown in the examples is based on the Sandvik Coromant Capto® system.

In FIG. 1 (d) a view of the front end surface along the rotational axis (X) is shown with four accelerometers received in the device. Four PCB Piezotronics 356A24 triaxial accelerometers 14, 14', 14", 14''' are received, each in one of the seats 9, 9', 9", 9'''. Each accelerometer is in the form of a cuboid body, having a square shaped bottom surface and a height which typically is much less than the length of one side of the bottom surface. The accelerometers are received in the respective recess, with a front side of the accelerometer pushed towards the inner radial contact surface 15 of each seat and thus positioning each accelerometer around the coupling point 8 with the same distance to the coupling point. Each seat also forms a side contact surface 16 providing lateral support for the accelerometer, e.g. in a tangential direction, or in y- or z-direction. Thus each accelerometer received in a seat is positioned and oriented in three dimensions in space and around three axes of rotation in relation to the coupling point.

Figure 1D:
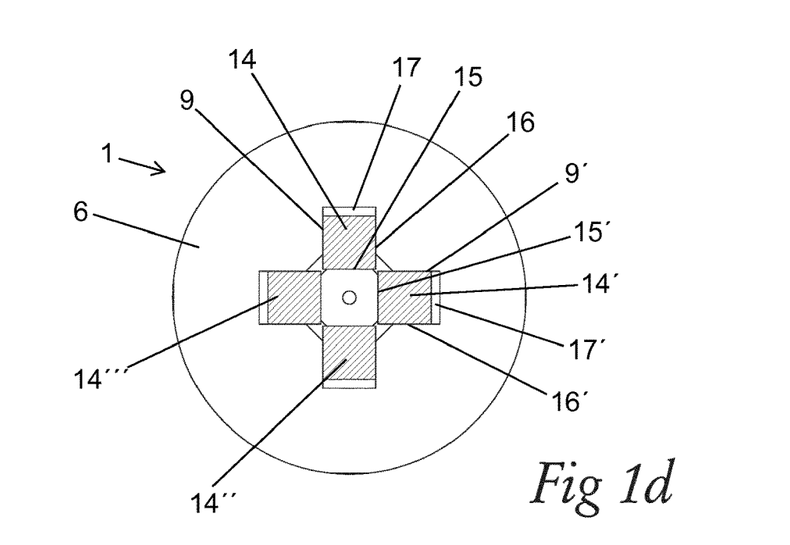

Each seat has an extension in the radial direction (i.e. a length of the seat) which is larger than the width of the seat. At a radially outer end of the recess a second radial surface is formed. The second radial surface is positioned radially outside the accelerometer, and thus a gap 16 is formed between the accelerometer and the second radial surface. This allows each accelerometer to be received in the recess and pressed towards the inner radial contact surface 15 of the seat.

The depth of the recess is small with respect to the height of the accelerometer. Thereby the accelerometer may be correctly positioned and oriented by means of the contact surfaces of the recess, while a major portion of the accelerometer extend from the front end surface, thus providing space for connecting wires to the accelerometer for conducting measurement signals.

The accelerometers are attached in the recesses forming the seats by a thin layer of adhesive. Alternatively the accelerometers may be fastened by mechanical fastening, e.g. screws or by press fit.

Receptance coupling technique is used to synthesise the dynamic response at the tool tip. The advantage of the receptance coupling technique is that a mechanical system, in this case the machine tool with the mounted cutting tool, may be viewed as an assembly of subsystems. This approach allows the frequency response to be obtained from substructuring based on a mixture of measurements, modelling and analysis depending on what suits best to the substructure in question.

During operation of the measurement device, one accelerometer is mounted in each seat of the device. The device is mounted in a machine to be used, e.g. a milling machine. The device is thereafter sequentially excited by mechanical energy in three perpendicular directions by connecting an excitation device in the form of a shaker actuator. The shaker actuator is thus moved between excitation locations, $F_x$, $F_y$ and $F_z$, (see FIG. 2*b*). To acquire the all frequency response functions (FRFs) that describes the six degrees of freedom (DOF) at the coupling point one would have to measure four different types of FRFs, namely translational and rotational responses to translational force and rotational moment separately. The response at the coupling point is based on calculations which will be described below and is based on the mean and the difference between paired accelerometers on both sides of the coupling point to retrieve translational and rotational responses based on translational excitation.

Figure 2A:
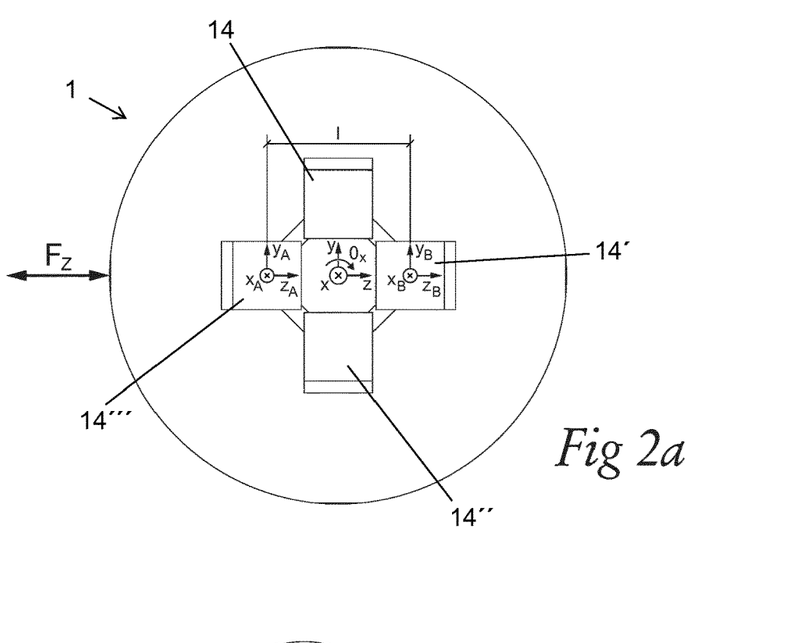
FIG. 2 illustrates a measurement of translational and rotational response, and a reference coordinate system.

To exemplify this one may retrieve the direct frequency response in z-direction, $H_{zz}$, by averaging the responses of the accelerometer, see Eq. 1 and FIG. 2*a* and the rotational response around the x-axis, $H_{\phi xz}$, see Eq. 2, by the difference of the translational response in y-direction of the accelerometer A and B, see FIG. 2*a*.

$$H_{zz} = \frac{\ddot{z}_A + \ddot{z}_B}{2F_z} \quad \text{(Eq. 1)}$$

$$H_{\phi xz} = \frac{\ddot{y}_A - \ddot{y}_B}{lF} \quad \text{(Eq. 2)}$$

Figure 2B:
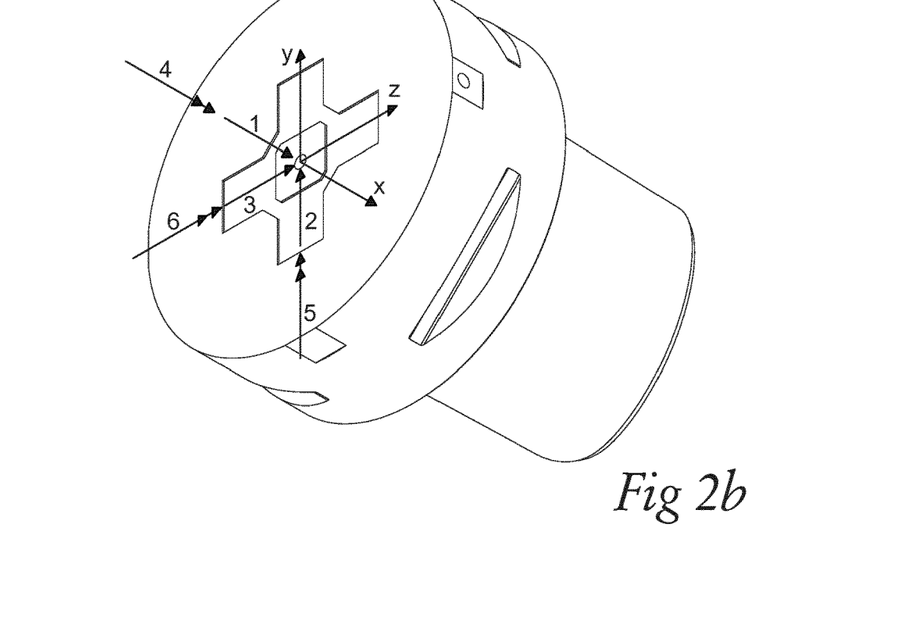

By adopting this methodology, and changing notation henceforth for brevity in accordance with FIG. 2*b*, half of the required elements in the FRF matrix, Eq. 3 may be measured.

$$H_{ij} = \begin{bmatrix} H_{11} & H_{12} & H_{13} \\ H_{21} & H_{22} & H_{23} \\ H_{31} & H_{32} & H_{33} \\ H_{41} & H_{42} & H_{43} \\ H_{51} & H_{52} & H_{53} \\ H_{61} & H_{62} & H_{63} \end{bmatrix} \quad \text{(Eq. 3)}$$

Maxwell-Betti's reciprocity principle is adopted and applied to the system identified state-space model, see 4.2, to fill the missing elements in the FRF matrix, Eq. 3. To create a system model of the substructures and couple these a methodology called state-space component synthesis is used and developed. This method relies on a continuous-time state-space description of a linear time invariant system with external force inputs u and displacement outputs y is written on the following form:

$$\begin{cases} \dot{x} = Ax + Bu \\ y = Cx + Du \end{cases} \quad \text{(Eq. 4)}$$

where x is the state vector and the constant coefficient matrices {A, B,C,D}, where A being the state matrix, B is the input matrix, C is the output matrix and D is the feedthrough matrix.

System identification is performed on the experimentally obtained FRFs of sub-system I using an automated model order estimation algorithm. The algorithm uses a bootstrapping and statistical evaluations in combination with the MATLAB's implemented state-space subspace system identification algorithm, n4 sid, with enforced model stability resulting in a MIMO (Multiple Input Multiple Output) state-space FRF on the following form, Eq. 5.

$$H(\omega) = C(j\omega I - A)B \quad \text{(Eq. 5)}$$

The reciprocity principle for a linear system states, using FIG. 2*a* for reference, that a system excited at the coupling node in direction 1 with measured response at the same location in direction 2 is identical to the response in direction 1 if the same excitation force is applied in direction 2. Hence the following mathematical relation holds:

$$H_{ij} = H_{ji} \quad \text{(Eq. 6)}$$

To establish a full FRF matrix the first step is to take the state space model to block diagonal form using the following transformations, Eq. 7, using the left, $V_{left}$ and right, $V_{right}$, eigenvectors.

$$\tilde{A} = V_{left} A V_{right}, \quad [\tilde{B}_T \ \tilde{B}_M] = V_{left}[B_T \ B_M], \quad \text{(Eq. 7)}$$

$$\begin{bmatrix} \tilde{C}_T \\ \tilde{C}_\phi \end{bmatrix} = \begin{bmatrix} C_T \\ C_\phi \end{bmatrix} V_{right}$$

The subscripts, T, M associated with the B matrix denotes the translational and moment input, where $B_M$ is missing from the measurements, while T and φ associated with the C matrix denotes the translational and rotational outputs which all are accounted for from the measurements. By combining Eq. 5, 6 and 7 one retrieve the following reciprocity relation, Eq. 8

$$\tilde{C}_T(j\omega I - \tilde{A})^{-1}\tilde{B}_M = \tilde{C}_\phi(j\omega I - \tilde{A})^{-1}\tilde{B}_T \quad \text{(Eq. 8)}$$

where $$(j\omega I - \tilde{A})^{-1} = \text{diag}\left(\frac{1}{j\omega - \lambda_1}, \frac{1}{j\omega - \lambda_2}, \ldots\right) \quad \text{(Eq. 9)}$$

and based on the n:th mode contribution one may write the reciprocal relation to each mode as $$\frac{\tilde{c}_{T,n}\tilde{b}_{M,n}}{j\omega - \lambda_n} = \frac{\tilde{c}_{\phi,n}\tilde{b}_{T,n}}{j\omega - \lambda_n} \quad \text{(Eq. 10)}$$

which gives $$\tilde{b}_{M,n} = \frac{\tilde{c}_{\phi,n}\tilde{b}_{T,n}}{\tilde{c}_{T,n}} \quad \text{(Eq. 11)}$$

To retrieve the missing input entities of $B_M$ the system is transformed back to its original form, Eq. 12.

$$B_M = V_{right}\tilde{B}_M \quad \text{(Eq. 12)}$$

And from (Eq. 12) one may now establish the full FRF matrix as $$H_{ij} = \begin{bmatrix} H_{11} & H_{12} & H_{13} & H_{14} & H_{15} & H_{16} \\ H_{21} & H_{22} & H_{23} & H_{24} & H_{25} & H_{26} \\ H_{31} & H_{32} & H_{33} & H_{34} & H_{35} & H_{36} \\ H_{41} & H_{42} & H_{43} & H_{44} & H_{45} & H_{46} \\ H_{51} & H_{52} & H_{53} & H_{54} & H_{55} & H_{56} \\ H_{61} & H_{62} & H_{63} & H_{64} & H_{65} & H_{66} \end{bmatrix} \quad \text{(Eq. 13)}$$

On top of the physical constraints mentioned above, stability and reciprocity is also accounted for.

Figure 3:
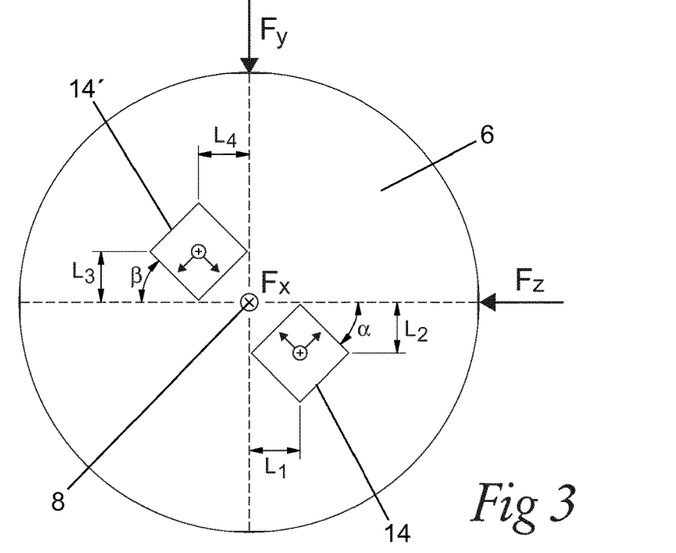
FIG. 3 shows a measurement device according to another embodiment.
Figure 4:
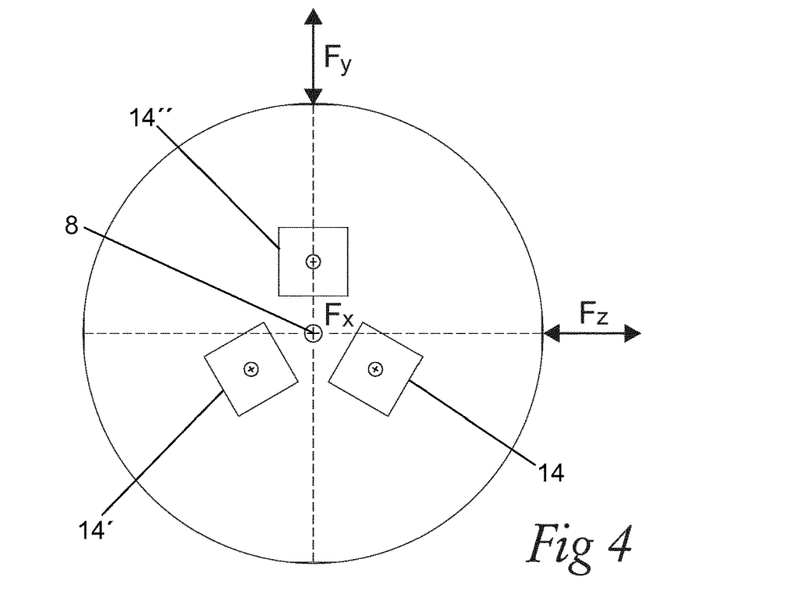
FIG. 4 shows a measurement device according to a further embodiment.

As alternative accelerometer configurations, FIGS. 3 and 4 show examples of two and three accelerometers respectively. For the alternative shown in FIG. 3, the two accelerometers 14 and 14' are pairwise arranged on opposite sides of the coupling point 8. The two accelerometers are angled to the y and z axis with angles $\alpha$ and $\beta$ respectively, where $\alpha$ and $\beta$ preferably are the same, e.g. 45 degrees. By knowing the angles $\alpha$ and $\beta$, and the positions $L_1$, $L_2$, $L_3$ and $L_4$ of the accelerometers the response of the excitation in the x- y- and z-directions may be calculated, and thus the frequency response functions. FIG. 4 shows a corresponding alternative configuration with three accelerometers 14, 14' and 14" arranged around the coupling point 8. By knowing the position and rotation of each accelerometer the response of the excitation in the x- y- and z-directions may be calculated, and thus the frequency response functions.

In order to obtain frequency response functions of an arbitrary chip removing machining tool in a machine the method is as follows. First two substructures are defined, wherein a first substructure consists of the machine with the mounted tool, but without the tool tip. A second substructure is defined to consist of only the tool tip of the tool.

A measurement device corresponding to the tool without a tool tip is thereafter mounted in the machine, with accelerometers received in the seats, and a measurement is conducted as described previously. From the result of the measurement frequency response functions of the measurement device mounted in the machine is calculated. In FIG. 5 an example of a cutting tool with tool tip is shown in (a). In FIG. 5 (b) the corresponding substructuring is illustrated showing the tool tip of the cutting tool as the second substructure II. The first substructure I, i.e. the cutting tool mounted in the machine but without the tool tip, is illustrated as the measurement setup where the measurement device 1 with a set of accelerometers 14 is mounted in the machine.

Frequency response functions of the second substructure, i.e. the specific tool tip of the cutting tool, are calculated by a Finite Element Method (FEM). Thereafter the frequency response functions of the first and second substructures are coupled to obtain frequency response functions for an assembled system comprising the first and second substructures, thus corresponding to the tool mounted in the machine. The coupling of frequency response functions is described e.g. in P. Sjövall, "Identification and synthesis of components for vibration transfer path analysis" (Ph.D. thesis, Chalmers University of Technology, Gothenburg, Sweden, 2007).

Using the frequency response functions of the combined structure, a stability chart of the tool mounted in the machine is calculated. One example of a stability chart is shown in FIG. 6. In this chart the stability of rotational speed (horizontal axis) versus cutting depth of the cutting tool (vertical axis) is shown. Below the solid plotted line, machining operation is considered to be stable, i.e. the risk of chatter vibrations is low. Above the solid line there is a risk of substantial chatter vibrations, which may be a problem during machining as discussed in the introduction. Thus, from the stability chart operational parameters may be selected to provide good cutting performance (e.g. marked as O), and thus operational parameters where chatter vibrations may occur (e.g. marked as X) may be avoided. Thus operational parameters within a stable region indicated by the stability chart may be selected.

The invention claimed is:

1. A measurement device for a chip removing machine, the device comprising:
    a front end, a rear end and a centre axis extending between the front and rear ends;
    an engagement portion disposed at the rear end arranged to engage the machine; and
    a measurement portion disposed at the front end, distal to the engagement portion,
wherein the measurement portion is without a tool tip, the measurement portion including a planar front end surface, which is perpendicular to the centre axis and which includes a coupling point for receiving mechanical excitation, wherein the coupling point is aligned with the centre axis and wherein the front end surface includes a plurality of seats arranged to each receive an accelerometer for measuring a response of the received mechanical excitation, wherein each seat includes three contact surfaces for the accelerometer such that, when an accelerometer is received in one of the seats and abutting against the three contact surfaces, it is positioned and oriented in three dimensions in space and around three axes of rotation in relation to the coupling point, wherein the measurement portion has a cylindrical envelope surface connected to the planar front end surface at the front end.

2. The measurement device according to claim 1, wherein one of the three contact surfaces is an axial contact surface, which extends perpendicular to the centre axis.

3. The measurement device according to claim 1, wherein one of the three contact surfaces is a radial contact surface.

4. The measurement device according to claim 3, wherein the radial contact surface of each seat is positioned at a same distance to the coupling point.

5. The measurement device according to claim 1, further comprising four seats for receiving and positioning four accelerometers around the coupling point.

6. The measurement device according to claim 5, wherein the seats are rotationally, symmetrically arranged around the coupling point.

7. The measurement device according to claim 1, wherein the seats are formed as recesses in the front end surface.

8. The measurement device according to claim 7, wherein each seat is formed as a cuboid recess for receiving an accelerometer of a cuboid shape.

9. The measurement device according to claim 7, wherein each seat is connected to neighbouring seats by a recess.

10. The measurement device according to claim 1, wherein the engagement portion has a rear end surface and a tapered male coupling part with a rounded polygonal cross-section protruding rearwardly from the rear end surface, wherein the rear end surface is radially outside the male coupling part, forming a contact surface.

11. The measurement device according to claim 1, wherein two planar excitation surfaces for coupling a source of mechanical excitation normal to the respective excitation surface are formed in the envelop surface perpendicular to one another and to the front end surface and having normal axes crossing the centre axis.

12. The measurement device according to claim 1, further comprising one accelerometer received in each seat.

13. The measurement device according to claim 12, wherein the accelerometers have a cuboid shape with a bottom surface and a forward surface, wherein each seat is formed as a recess in the front end surface, wherein one of the three contact surfaces of each seat is an axial contact surface, which extends perpendicular to the centre axis, wherein another one of the three contact surfaces of the seat is a radial surface for providing support in a direction towards the centre axis, and wherein the bottom surface is in contact with the axial surface of the seat, at least a portion of the forward surface being in contact with the radial surface of the seat.

14. The measurement device according to claim 13, wherein each seat includes a second radial surface, located radially outside the accelerometer, and wherein a gap is formed between the accelerometer and the second radial surface.

15. The measurement device according to claim 13, wherein the accelerometers each have a height and wherein each recess has a depth less than the height of the accelerometers, such that a major portion of each of the accelerometers extends from the front end surface.

16. The measurement device according to claim 12, wherein the accelerometers are attached to the seats by adhesive.

17. A method of obtaining frequency response functions of a chip removing machining tool in a machine, comprising:

defining two substructures, a first substructure consisting of a machine with a mounted tool, without a tool tip, and a second substructure consisting of the tool tip of the tool;

mounting a measurement device corresponding to the tool without a tool tip in the machine, the measurement device including a front end, a rear end, and a centre axis extending between the front and rear ends, an engagement portion disposed at the rear end arranged to engage the machine, and a measurement portion disposed at the front end, distal to the engagement portion, wherein the measurement portion is without the tool tip, the measurement portion including a planar front end surface, which is perpendicular to the centre axis and which includes a coupling point for receiving mechanical excitation, wherein the coupling point is aligned with the centre axis and wherein the front end surface includes a plurality of seats arranged to each receive an accelerometer for measuring a response of the received mechanical excitation, wherein each seat includes three contact surfaces for the accelerometer such that, when an accelerometer is received in one of the seats and abutting against the three contact surfaces, it is positioned and oriented in three dimensions in space and around three axes of rotation in relation to the coupling point;

mounting one accelerometer in each seat;

exciting the measurement device with mechanical energy;

measuring the response of the excitation by the accelerometers and calculating frequency response functions of the measurement device mounted in the machine, from the measured excitation response;

associating the frequency response functions of the first substructure with the frequency response functions of the measurement device mounted in the machine;

calculating frequency response functions of the second substructure; and coupling the frequency response functions of the first and second substructures to obtain frequency response functions for an assembled system comprising the first and second substructures.

18. The method according to claim 17, wherein exciting the measurement device with mechanical energy includes sequentially exciting the device with mechanical energy in three perpendicular directions.

19. A method for obtaining a stability chart of a chip removing machining tool in a machine, comprising:

obtaining a combined frequency response functions of the tool in the machine, according to claim 17; and calculating the stability chart for the combined structure based on the combined frequency response functions.

20. A method for selecting operational parameters of a chip removing machining tool in a machine, comprising:

obtaining a stability chart of a chip removing machining tool in a machine, according to claim 19; and selecting operational parameters within a stable region indicated by the stability chart.

* * * * *